United States Patent [19]
Dublinski et al.

[11] Patent Number: 5,354,195
[45] Date of Patent: Oct. 11, 1994

[54] COMPOSITE MOLDING APPARATUS FOR HIGH PRESSURE CO-CURE MOLDING OF LIGHTWEIGHT HONEYCOMB CORE COMPOSITE ARTICLES HAVING RAMPED SURFACES UTILIZING LOW DENSITY, STABILIZED RAMPED HONEYCOMB CORES

[75] Inventors: Alex C. Dublinski, Northford; Thomas A. Carstensen, Shelton; Philip J. Ramey, Milford, all of Conn.

[73] Assignee: United Technologies Corporation, Hartford, Conn.

[21] Appl. No.: 995,437

[22] Filed: Dec. 23, 1992

[51] Int. Cl.⁵ .......................................... B29C 33/18
[52] U.S. Cl. ...................... 425/504; 156/285; 156/382; 249/83; 264/511; 425/394; 425/403; 428/116
[58] Field of Search ............. 425/394, 403, 504; 264/510, 511; 156/285, 382; 428/116; 249/83, 175, 177

[56] References Cited

U.S. PATENT DOCUMENTS

| | | | |
|---|---|---|---|
| 4,350,551 | 9/1982 | Michaelson | 428/116 X |
| 4,562,033 | 12/1985 | Johnson et al. | 264/504 |
| 4,683,099 | 7/1987 | Buxton et al. | 264/511 |
| 4,879,152 | 11/1989 | Green | 428/116 X |
| 4,915,896 | 4/1990 | Rachal et al. | 264/511 |
| 5,071,338 | 12/1991 | Dublinski et al. | 425/403 |
| 5,106,568 | 4/1992 | Honka | 264/510 |
| 5,122,318 | 6/1992 | Bonet et al. | 264/511 X |
| 5,236,646 | 8/1993 | Cochran et al. | 264/511 X |
| 5,242,651 | 9/1993 | Brayden et al. | 264/510 |
| 5,248,242 | 9/1993 | Lallo et al. | 156/285 X |

*Primary Examiner*—Richard L. Chiesa
*Attorney, Agent, or Firm*—Terrance J. Radke

[57] ABSTRACT

A composite molding apparatus for high pressure co-cure molding of lightweight honeycomb core composite articles having ramped surfaces utilizing low total density, stabilized ramped honeycomb cores. The composite molding apparatus is a semi-rigid molding assembly that includes a rigid base member and a complementary semi-rigid mold member that is formed from a combination of layers of fiber-reinforced elastomeric material and unreinforced elastomeric material. The semi-rigid mold member further includes internal rigid reinforcement inserts formed from a structurally rigid material and having a configuration that matches the configuration of the ramped surfaces of the honeycomb composite article. The rigid reinforcement inserts are interleaved between the layers of fiber-reinforced elastomeric material and/or unreinforced elastomeric material forming the semi-rigid mold member. The rigid reinforcement inserts of the semi-rigid mold member provide symmetric pressure distribution over the ramped surfaces of the honeycomb core and the overlayed composite prepregs during the high pressure co-cure process.

3 Claims, 4 Drawing Sheets

COMPOSITE MOLDING APPARATUS FOR HIGH PRESSURE CO-CURE MOLDING OF LIGHTWEIGHT HONEYCOMB CORE COMPOSITE ARTICLES HAVING RAMPED SURFACES UTILIZING LOW DENSITY, STABILIZED RAMPED HONEYCOMB CORES

TECHNICAL FIELD

The present invention relates to apparatus for molding composite articles, and more particularly, to a composite molding apparatus for high pressure co-cure molding of lightweight honeycomb core composite articles having ramped surfaces utilizing low total density, stabilized ramped honeycomb cores.

BACKGROUND OF THE INVENTION

Composite articles incorporating honeycomb cores are commonly utilized for fabricating aerospace structures due to the advantageous combination of high strength and low weight. Honeycomb core composite articles are comprised of upper and lower fiber-reinforced, resin impregnated composite laminates that are separated and stabilized by the honeycomb core. Due to the high bending stiffness and compressive strength properties of honeycomb core composite articles, i.e., the honeycomb core functions as a shear web and separates the composite laminates from the bending neutral axis, honeycomb core composite articles have particular utility in aerospace applications such as aircraft fuselage panels and door structures. The high strength and low weight of aircraft fuselage panels and door structures fabricated as honeycomb core composite articles results in a lower overall aircraft system weight.

Honeycomb core composite articles may be fabricated utilizing black bag technology, i.e., the composite laminates and the honeycomb core are layed-up in a semi-rigid molding assembly comprised of a rigid mold member and a semi-rigid mold member, which is vacuum-bagged and co-cured under pressure and temperature in an autoclave. The lower composite laminates, the honeycomb core, and the upper composite laminates are sequentially layed-up in the semi-rigid molding assembly so that the honeycomb core is overlayed by the upper and lower composite laminates. The upper and lower composite laminates are prepregs, i.e., woven fibrous cloth, yarn, or fiber tow comprised of a matrix of orientated fibrous material such as graphite, aramids (e.g., KEVLAR ®. a registered trademark of E. I. du Pont de Nemours & Co., Wilmington, Del., for an aromatic polyamide fiber of extremely high tensile strength), boron, fiberglass, or the like, which is impregnated with an epoxy, phenolic, or other similar organic resinous material, and staged to form the prepreg. Film adhesive, which is applied to the honeycomb core prior to lay-up, forms the bonds between the upper and lower composite laminates and the net-shaped honeycomb core during the co-cure procedure.

Many of the aircraft fuselage panels and door structures that are fabricated as honeycomb core composite articles have configurations that include one or more ramped surfaces. Such ramped surfaces present several interrelated problems that adversely affect the fabrication and utilization of honeycomb core composite articles having ramped surfaces. First, honeycomb core material must be net shaped prior to the lay-up procedure to incorporate any such ramped surfaces, i.e., a ramped honeycomb core must be formed. Concomitantly, the honeycomb core material must be "stabilized" prior to the net shaping operation so as to preclude damage to the honeycomb core material during the net shaping operation.

Honeycomb core material is generally net shaped to incorporate ramped surfaces by machining the "stabilized" honeycomb core material to remove material, thereby forming one or more ramped surfaces. To stabilize such honeycomb core material for machining, i.e., to preclude accordioning during the machining process, film adhesive is generally applied to the upper and lower major surfaces of the honeycomb core material, and the coated honeycomb core material is cured. The cured honeycomb core material is then machined to net shape, i.e., a ramped honeycomb core.

Another layer of film adhesive is applied to the ramped honeycomb core to "prep" the ramped honeycomb core for lay-up in the semi-rigid molding assembly and subsequent co-curing. During the co-curing procedure, the second adhesive film layer forms the bonds between the upper and lower composite laminates and the ramped honeycomb core. While the foregoing fabrication techniques produce ramped honeycomb cores that are generally acceptable for black bag technology usage, such cores generally have a high total density (the phrase "total density" as used herein refers to the density of the ramped honeycomb core and the density of the film adhesive used for "stabilization" and "preparation") due to the non-optimized application of film adhesives to "stabilize" the honeycomb core material for the net shaping operation and to "prep" the ramped honeycomb core to effectuate bonding between the upper and lower composite laminates and the ramped honeycomb core during co-cure. These high total density honeycomb cores may not be acceptable for applications wherein the minimization of overall aircraft system weight is a critical design criterion.

In addition, such ramped honeycomb cores may not be sufficiently stabilized for use with present day black bag technology. Crushing, i.e., collapse, of the ramped surfaces of ramped honeycomb cores is a recurring problem during the co-curing stage of fabricating ramped honeycomb core composite articles. Crushing may occur as a result of insufficient stabilization of the ramped honeycomb core, or as a result of asymmetric pressure distributions over the ramped surfaces during the co-curing procedure, or a combination thereof. Stabilization of ramped honeycomb cores may be achieved by applying expanding adhesive foam or syntactic foam to the outer walls of the core, or utilizing expanding adhesive foam or syntactic foam to fill the core. These stabilization options, however, are not practical for applications wherein the minimization of overall aircraft system weight is a critical design criterion inasmuch as the use of expanding adhesive or syntactic foam for stabilization of ramped honeycomb cores incurs a prohibitive weight penalty. For example, one commonly utilized syntactic foam, EPOCAST ®, has a typical density range of about 30–50 lb/ft$^3$.

Another option available to minimize core crushing during the co-curing procedure is to limit the co-cure pressure. As a general rule, limiting the co-cure pressure to a maximum value of about 45 psi significantly reduces the number of incidents of core crushing in fabricating ramped honeycomb core composite articles. Limiting the maximum co-cure pressure, however, is generally unacceptable for other aspects of the molding process. For example, the composite laminates of ramped honeycomb core composite articles fabricated utilizing low co-cure pressures, i.e., ≦ 45 psi, may embody an unacceptable level of voids, i.e., zones within the composite laminates that are insufficiently consolidated. Or, the low co-cure pressure limits may preclude complete bonding between the upper and lower composite laminates and the ramped honeycomb core. Voids and/or incomplete bonds due to low co-cure pressure limits may result in ramped honeycomb core composite articles that do not have mechanical characteristics, e.g., high strength, acceptable for use in aerospace applications.

It would be advantageous, especially for aerospace applications, to provide a co-cure molding process for fabricating honeycomb core composite articles having ramped surfaces that utilizes high co-cure pressures. To effectively utilize such high pressure co-cure molding processes, a need exists to provide ramped honeycomb cores that are optimally formed for low total density and stability in such high pressure co-cure composite molding processes. Concomitantly, a need exists to provide a composite molding apparatus for use in such high pressure co-cure molding processes utilizing low density, stabilized ramped honeycomb cores that is optimized to provide symmetric pressure distributions over the ramped surfaces of the composite laminate lay-ups and the low density, stabilized ramped honeycomb core during the co-curing stage of such molding processes.

SUMMARY OF THE INVENTION

One object of the present invention is to provide a co-cure composite molding process for fabricating lightweight, honeycomb core composite articles having ramped surfaces that utilizes high co-cure pressures during the co-curing stage.

Another object of the present invention is to provide a low total density, stabilized ramped honeycomb core for utilization in such high pressure co-cure composite molding processes to fabricate lightweight, honeycomb core composite articles having ramped surfaces that have a significant weight savings over ramped honeycomb core composite articles fabricated utilizing conventional techniques.

A further object of the present invention is to provide a composite molding apparatus for such high pressure co-cure composite molding processes utilizing stabilized, low density ramped honeycomb cores that is optimized to provide symmetric pressure distributions over the ramped surfaces of the composite laminate lay-ups and the low density, stabilized ramped honeycomb core during the co-curing stage of such molding processes.

These and other objects are achieved by a composite molding apparatus and method for high-pressure co-cure molding of lightweight honeycomb core composite articles having ramped surfaces utilizing low total density, stabilized ramped honeycomb cores according to the present invention. The low total density, stabilized ramped honeycomb core is fabricated utilizing an optimal application technique to apply layers of low areal weight film adhesive for stabilization of honeycomb core material and preparation of a ramped honeycomb core for lay-up and co-cure.

The low total density, stabilized ramped honeycomb core is formed by net shaping stabilized honeycomb core material to include ramped surfaces. The honeycomb core material is stabilized for the net shaping operation by applying a layer of low areal weight film adhesive to the upper and lower major surfaces of the honeycomb core material in a picture frame format. More specifically, the layer of film adhesive applied to the upper major surface extends inwardly a predetermined distance beyond the ramped surfaces to be machined. The layer of film adhesive applied to the lower major surface extends inwardly the predetermined distance from the edges of the honeycomb core material.

The stabilized honeycomb core material is net shaped to form a ramped honeycomb core. To prepare the ramped honeycomb core for lay-up and co-cure, a layer of low areal weight film adhesive is applied to the upper and lower major surfaces and the ramped surfaces of the ramped honeycomb core to form the low total density, stabilized ramped honeycomb core.

The composite molding apparatus is a semi-rigid molding assembly that includes a rigid base member having a molding surface and a complementary semi-rigid mold member having molding surfaces. The molding surfaces of the rigid base member and the semi-rigid mold member in combination define the outer mold line surface of the lightweight honeycomb core composite article to be fabricated.

The semi-rigid mold member is formed from a combination of layers of reinforced tooling material, i.e., a fiber-reinforced elastomeric material, and an unreinforced elastomeric material. The semi-rigid mold member includes internal rigid reinforcement inserts formed from a structurally rigid material and having a configuration that matches the configuration of the ramped surfaces of the lightweight honeycomb core composite article to be fabricated. The rigid reinforcement inserts are interleaved between layers of reinforced tooling material and/or unreinforced elastomeric material forming the semi-rigid mold member. The internal rigid reinforcement inserts of the semi-rigid mold member are operative to provide symmetric pressure distributions over the ramped surfaces of the low total density, stabilized ramped honeycomb core and the overlayed composite prepregs.

Composite prepregs and the low total density, stabilized ramped honeycomb core are layed-up in the semi-rigid molding assembly, which is vacuum bagged and disposed in an autoclave. The vacuum bag is evacuated, and the layed-up molding assembly is subjected to a two stage pressure, temperature cycle for high pressure co-cure. The autoclave is pressurized to a predetermined dwell pressure, and the temperature of the autoclave is then gradually raised from ambient to a predetermined dwell temperature. The autoclave is then stabilized at the predetermined dwell pressure and the predetermined dwell temperature for a predetermined dwell period.

After the predetermined dwell period has elapsed, the autoclave pressure is increased from the predetermined dwell pressure to a predetermined high pressure. Next, the temperature of the autoclave is raised from the predetermined dwell temperature to a predetermined co-cure temperature. The autoclave is then stabilized at the predetermined high pressure and the predetermined co-cure temperature for a predetermined co-cure period to effect curing of the lay-up. After curing is complete, i.e., elapse of the predetermined co-cure period, the autoclave is cooled to ambient temperature. Then the autoclave is depressurized for removal of the composite molding apparatus, which is subsequently debagged and opened for removal of the lightweight honeycomb core composite article having ramped surfaces.

BRIEF DESCRIPTION OF THE DRAWINGS

A more complete understanding of the present invention and the attendant features and advantages thereof may be had by reference to the following detailed description when considered in conjunction with the accompanying drawings wherein.

DETAILED DESCRIPTION OF PREFERRED EMBODIMENTS

Figure 1:
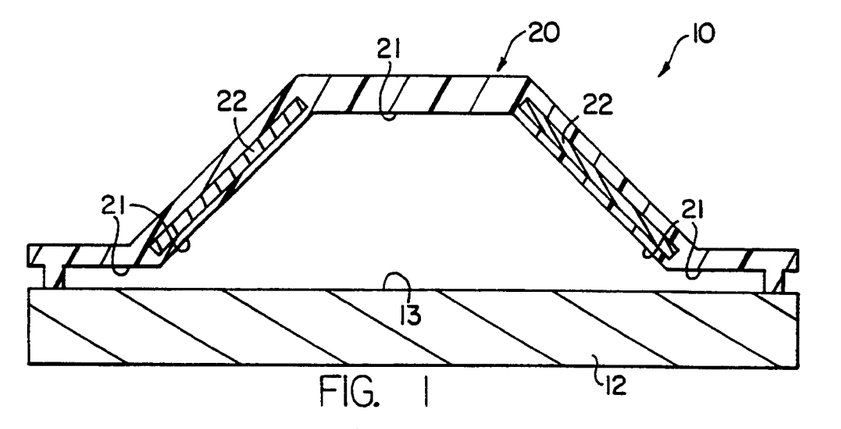
FIG. 1 is a cross-sectional view of an exemplary composite molding apparatus according to the present invention.

Referring now to the drawings wherein like reference characters identify corresponding or similar elements throughout the several views, FIG. 1 illustrates an exemplary embodiment of a composite molding apparatus 10 for a high pressure co-cure molding process according to the present invention for fabricating lightweight honeycomb core composite articles having ramped surfaces (LHCC articles) utilizing a low total density, stabilized ramped honeycomb core 30 (see FIG. 4) fabricated as described hereinbelow in further detail. Materials for use in composite molding processes are typically comprised of a matrix of orientated fibrous material such as graphite, aramids (e.g., KEVLAR ®, a registered trademark of E. I. du Pont de Nemours & Co., Wilmington, Del., for an aromatic polyamide fiber of extremely high tensile strength), boron, fiberglass, or the like impregnated with an epoxy, phenolic, or other similar organic resinous material. The composite molding apparatus 10 and the high pressure co-cure molding process according to the present invention are adapted to utilize composite prepregs to fabricate LHCC articles. Composite prepregs are formed from woven fibrous cloth, yarn, or fiber tow comprised of a matrix of orientated fibrous material such as graphite, aramids (e.g., KEVLAR ®), boron, fiberglass, or the like, which is impregnated with a predetermined amount of epoxy, phenolic, or other similar organic resinous material. The organic resin impregnated composite material is staged to form the ("tacky") composite material (prepreg). Composite prepregs in the tacky condition are handled and processed in all the operations comprising the pre-cure lay-up phase.

The composite molding apparatus 10 is a semi-rigid molding assembly that comprises a rigid base member 12 and a complementary semi-rigid mold member 20. The molding surfaces of the rigid base member 12 and the complementary semi-rigid mold member 20 in combination define the outer mold line surface of the LHCC article to be fabricated. The rigid base member 12 is formed from a structurally rigid material such as steel. The rigid base member 12 illustrated in the exemplary embodiment of FIG. 1 has a molding surface 13 that has a flat plate configuration. One skilled in the art, however, will appreciate that the rigid base member may have a more complex molding surface configuration, depending upon the configuration of the LHCC article to be fabricated.

The complementary semi-rigid mold member 20 is a semi-rigid shaped member formed from a fiber-reinforced elastomeric material, as described hereinbelow in further detail, that possesses a predetermined degree of flexibility so that the molding surfaces 21 of the mold member 20 conform to and define the outer mold line surface of the LHCC article to be fabricated. The semi-rigid mold member 20 is operative to provide uniform pressure transfer during the high pressure co-cure molding process of the present invention. And, to facilitate the high pressure co-curing process, rigid reinforcement inserts 22, as described hereinbelow in further detail, are disposed in the semi-rigid mold member 20 and operative to provide symmetric pressure distributions over the ramped surfaces of the LHCC article being fabricated, i.e., over the ramped surfaces of the low total density, stabilized honeycomb core 30 and the corresponding overlayed composite prepregs. The rigid reinforcement inserts 22 and the low total density, stabilized ramped honeycomb core 30 are coactively operative in combination to essentially eliminate crushing of the ramped surfaces of the LHCC article during the high pressure co-cure stage of the high pressure co-cure molding process according to the present invention.

The semi-rigid mold member 20 of the composite molding apparatus is preferably fabricated according to the method described in U.S. Pat. No. 5,071,338, entitled "Tooling for Forming Complex Composite Articles", which is owned by the assignee of the present invention, and which is incorporated herein by reference. The mold member 20 is formed from a combination of reinforced tooling material, i.e., elastomer-impregnated fiber reinforcement material that is encapsulated in elastomeric material, unreinforced elastomeric material, and rigid reinforcement inserts 22, as described hereinbelow in further detail.

Fluoroelastomers such as FLUOREL ® (3M Company, St. Paul, Minn.), a fully-saturated fluorinated polymer containing more than 60% fluorine by weight, or VITON ® (E. I. du Pont de Nemours Corp., Wilmington, Del.), a series of fluoroelastomers based on a copolymer of vinylidene fluoride and hexafluoropropylene, are the preferred elastomeric materials due to their inertness, usability at high temperatures, and hardness range of about 70 to about 80 durometers. Other elastomers possessing similar characteristics such as halogenated elastomers, fluorosilicone elastomers, or fluorophoazene elastomers may also be used.

Aramid fibers or fabric such as KEVLAR ® is the preferred fiber reinforcement material due to its high tear strength, tensile strength and modulus of elasticity. Other fiber reinforcement material such as graphite or glass fibers may also be used. The fiber reinforcement material utilized should provide stiffness and rigidity in detail areas while concomitantly providing uniform compaction of the fiber reinforcement layup.

The elastomeric material is dissolved in a suitable solvent (about 80 to 99% by volume) such as an alkyl aromatic solvent, e.g., toluene (methylbenzene) or 2-butanone (methyl ethyl ketone), to form an elastomeric solution consisting of about 90 to about 95% solvent by volume. The elastomeric solution should not contain any elastomeric precipitate or undissolved higher weight polymers.

The elastomeric solution is coated onto the fiber reinforcement material, typically in the form of a fabric fabricated from a plurality of interwoven bundles of fibers, to completely impregnate the material wherein each fiber is totally encapsulated by the elastomeric solution. The solvent is then completely evaporated from the material using conventional techniques such as flashing or evaporation.

The impregnated material is then sandwiched between elastomeric sheets by conventional techniques such as calendering or pressing to form the reinforced tooling material that is utilized to fabricate the semi-rigid mold member 20.

The rigid reinforcement inserts 22 for the semi-rigid mold member 20 are operative to provide symmetric pressure distributions across the ramped surfaces of the LHCC article being fabricated, i.e., over the ramped surfaces of the low total density, stabilized honeycomb core 30 and the corresponding overlayed composite prepregs. To achieve this result, the rigid reinforcement inserts 22 are formed from a structurally rigid material that retains such rigidity at the co-cure temperature utilized in the high temperature co-cure molding process according to the present invention described hereinbelow. The rigid reinforcement inserts 22 are formed to have a planar configuration that matches the corresponding configurations of the ramped surfaces of the LHCC article being fabricated. For the exemplary embodiment of the composite molding apparatus 10 described herein, rigid reinforcement inserts 22 are fabricated from 6061T6 aluminum having a thickness of about 0.032 inches.

Prior to fabricating the semi-rigid mold member 20, a 1-to-1 scale model of the LHCC article to be fabricated is constructed using conventional molding techniques. Layers of reinforced tooling material and unreinforced elastomeric material, and the rigid reinforcement inserts 22 are then layed-up on the model. The number of layers of reinforced tooling material and unreinforced elastomeric material required to form the semi-rigid mold member 20, i.e., the thickness of the mold member 20, depends upon the particular application. During the lay-up process, the rigid reinforcement inserts 22 are interleaved between layers of reinforced tooling material and/or unreinforced elastomeric material forming the mold member 20. The rigid reinforcement inserts 22 are interleaved so as to be disposed in an opposed, parallel plane relationship with the corresponding ramped surfaces 32 of the model of the LHCC article (see FIG. 4).

The layed-up model is then vacuum bagged and a vacuum applied to ensure precise conformance of the layers of the reinforced tooling material, unreinforced elastomeric material, and interleaved rigid reinforcement inserts 22 comprising the semi-rigid mold member 20 to the configurational features of the model. After compaction, the vacuum-bagged, layed-up model may then be cured to form the semi-rigid mold member 20.

An exemplary curing cycle includes curing in an autoclave at about 300°–400° F., at about 100–200 psi pressure, for about 3–5 hours, and post-curing at about 400°–500° F, at atmospheric pressure, for about 8–10 hours. Prior to use, the semi-rigid mold member 20 may be conditioned to preclude adhesion of the mold member 20 to the finished LHCC article. A mold release agent, such as MS-142 (Miller Stevenson Co., Danbury, Conn.), a microspherical silicate material, is applied to the semi-rigid mold member 20 and the coated mold member 20 is then baked at about 350° F. for about two hours.

The semi-rigid mold member 20, fabricated as described in the preceding paragraphs, includes rigid reinforcement inserts 22 as integral, internal elements thereof. The mold member 20 is stable throughout a plurality of thermal cycles and therefore possesses the added benefit of being reusable (approximately 50 to 100 cycles). The mold member 20 is not susceptible to amine curing agents typically present in conventional organic resins, thereby enhancing its utility. The mechanical properties of the mold member 20 do not experience significant degradation over time, and minor damage to the mold member 20 may be rectified by coating the damaged portion with the above-described elastomeric solution.

Two interrelated design constraints confronted the inventors in the development of the low total density, stabilized ramped honeycomb core 30 for use in the composite molding apparatus 10 for the high pressure co-cure molding process according to the present invention. One was the requirement to provide a ramped honeycomb core of low total density, i.e., the density of the ramped honeycomb core plus the density of the film adhesive utilized for stabilizing honeycomb core material for the net shaping operation and for prepping the ramped honeycomb core for the lay-up and co-cure procedures. The second was to ensure that the ramped honeycomb core was "stabilized" for use in the high pressure co-cure molding process, i.e. no crushing of the honeycomb core ramp surfaces during the high pressure co-cure stage of the process.

The inventors determined that the key to successfully meeting these design constraints was the optimized application of film adhesives for stabilization of the honeycomb core material for the net shaping operation and prepping of the ramped honeycomb core, respectively, for the co-curing procedure. A number of different adhesive film application techniques, using different weight adhesives, were evaluated to determine the optimal application technique that resulted in the low total density, stabilized ramped honeycomb core 30 described hereinbelow in further detail.

During initial development, a ramped honeycomb core was fabricated by applying a layer of 0.06 weight film adhesive (as used herein, a single layer of 0.0X weight film adhesive has an areal weight of 0.0X lbs/ft$^2$) to the upper and lower major surfaces of honeycomb core material for stabilization thereof and applying a layer of 0.03 weight film adhesive to the upper and lower major surfaces of the ramped honeycomb core for prep thereof. While this ramped honeycomb core was sufficiently stable for use in a high pressure co-cure molding process, i.e., no crushing occurred during high pressure co-cure, the overall weight of the ramped honeycomb core due to the high total density thereof was excessive for utilization in aerospace applications where the minimization of overall aircraft system weight is a critical design criterion.

Figure 2A:
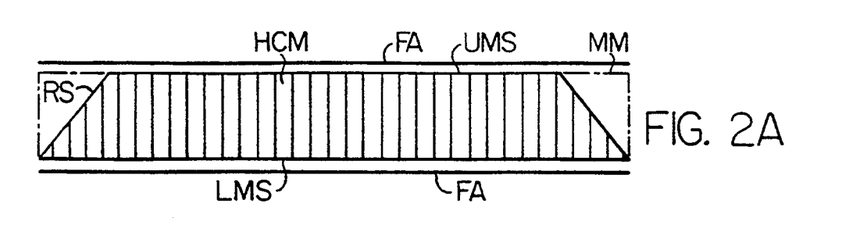
FIGS. 2A–2L illustrate various adhesive film application techniques for stabilizing honeycomb core material for net shaping operations and for prepping ramped honeycomb cores for lay-up and co-curing procedures.
Figure 2B:
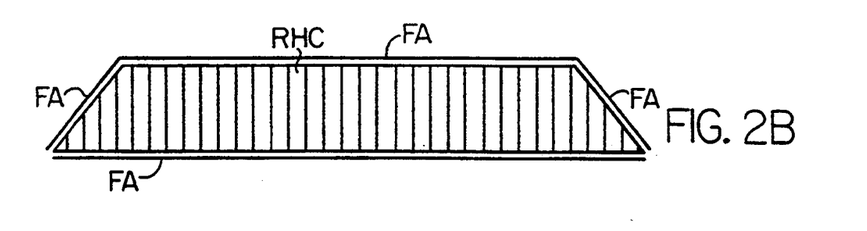

FIGS. 2A–2L illustrate several other application techniques for film adhesives evaluated for stabilization of the honeycomb core material for the net shaping operation and prepping of the ramped honeycomb core for the lay-up procedure described hereinbelow. Generally, reference characters HCM identify honeycomb core material, reference characters RHC identify a ramped honeycomb core, reference characters UMS and LMS identify upper and lower major surfaces, reference characters RS identify a ramped surface, reference characters MM identify honeycomb material removed from the stabilized honeycomb core material HCM by machining, and reference characters FA identify an application of film adhesive. FIG. 2A illustrates a honeycomb core material HCM stabilized by applications of 0.03 wt film adhesive FA to the upper and lower major surfaces UMS, LMS. FIG. 2B illustrates the ramped honeycomb core RHC derived from the stabilized honeycomb core material HCM of FIG. 2A, which was prepped for the co-curing procedure by applications of 0.03 wt film adhesive FA to the upper and lower major surfaces UMS, LMS and the ramped surfaces RS.

Figure 2C:
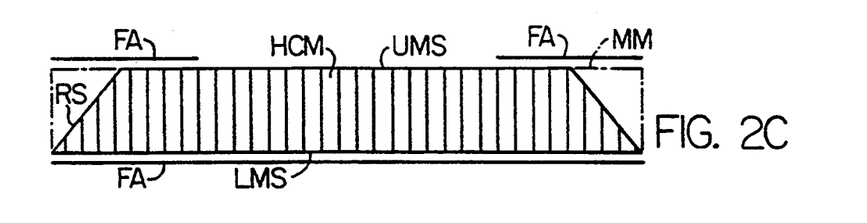
Figure 2D:
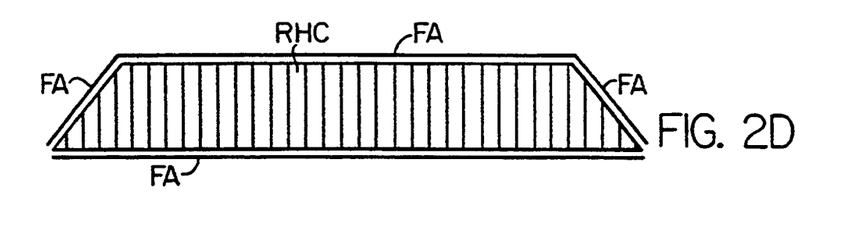
Figure 2E:
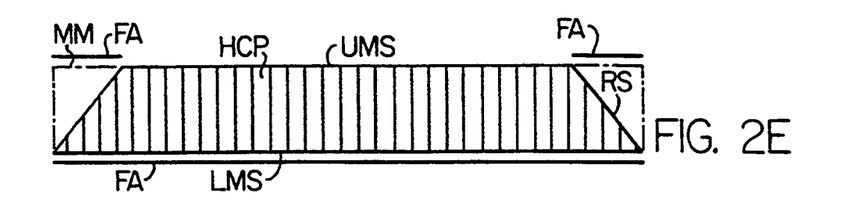
Figure 2F:
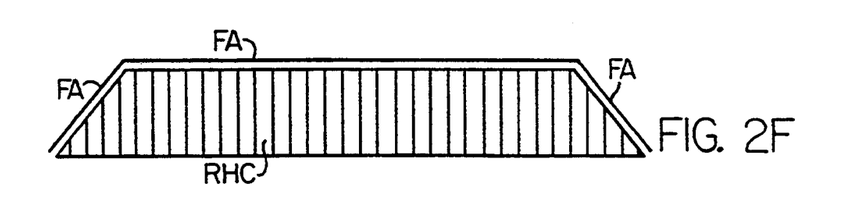

FIG. 2C illustrates a honeycomb core material HCM stabilized by application of 0.03 wt film adhesive FA to the lower major surface LMS and application of 0.06 wt film adhesive FA in a picture frame format to the upper major surface UMS. FIG. 2D illustrates the ramped honeycomb core RHC derived from the stabilized honeycomb core material HCM of FIG. 2C, which was prepped for the co-curing procedure by applications of 0.03 wt film adhesive FA to the upper and lower major surfaces UMS, LMS and the ramped surfaces RS. FIG. 2E illustrates a honeycomb core material HCM stabilized by application of 0.03 wt film adhesive FA to the lower major surface LMS and application of 0.06 wt film adhesive in a picture frame format to the upper major surface UMS. FIG. 2F illustrates the ramped honeycomb core RHC derived from the stabilized honeycomb core material HCM of FIG. 2E, which was prepped for the co-curing procedure by applications of 0.03 wt film adhesive FA to the upper major surface UMS and the ramped surfaces RS.

Figure 2G:
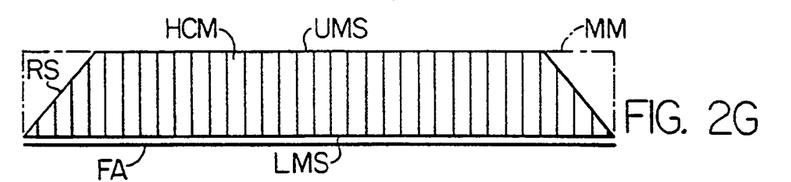
Figure 2H:
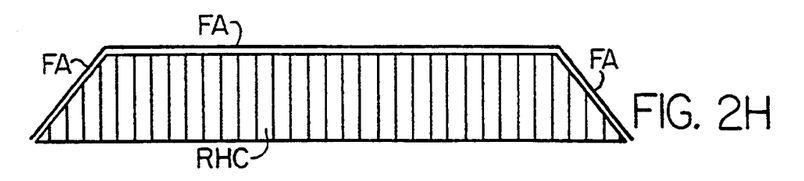
Figure 2I:
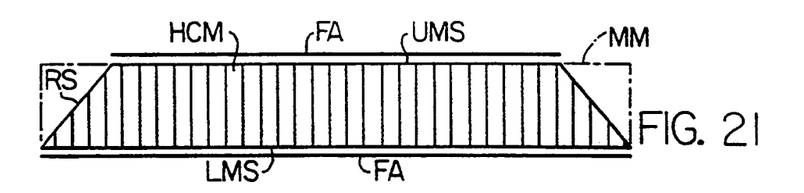
Figure 2J:
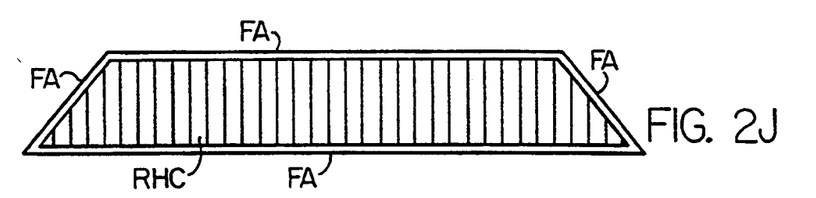
Figure 2K:
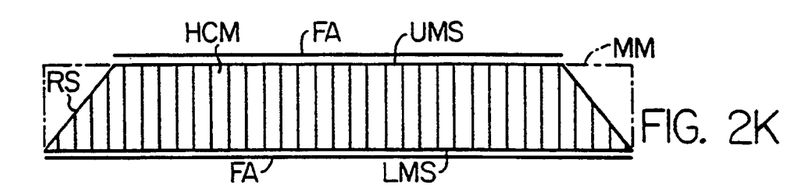
Figure 2L:
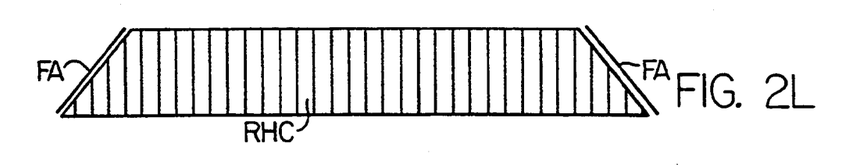

FIG. 2G illustrates a honeycomb core material HCM stabilized by application of 0.03 wt film adhesive FA to the lower major surface LMS. FIG. 2H illustrates the ramped honeycomb core RHC derived from the stabilized honeycomb core material HCM of FIG. 2G, which was prepped for the co-curing procedure by applications of 0.03 wt film adhesive FA to the upper major surface UMS and the ramp surfaces RS. FIG. 2I illustrates a honeycomb core material HCM stabilized by application of 0.03 wt film adhesive FA to the lower major surface LMS and application of 0.03 wt of unsupported film adhesive FA (unsupported film adhesive is film adhesive without the scrim carrier) to the upper major surface UMS. FIG. 2J illustrates the ramped honeycomb core RHC derived from the stabilized honeycomb core material HCM of FIG. 2I, which was prepped for the co-curing procedure by applications of 0.03 wt film adhesive FA to the upper and lower major surfaces UMS, LMS and the ramped surfaces RS. FIG. 2K illustrates a honeycomb core material HCM stabilized by application of 0.03 wt film adhesive FA to the lower major surface LMS and application of 0.03 wt of unsupported film adhesive FA to the upper major surface UMS. FIG. 2L illustrates the ramped honeycomb core RHC derived from the stabilized honeycomb core material HCM of FIG. 2K, which was prepped for the co-curing procedure by application of 0.03 wt film adhesive FA to the ramped surfaces RS only.

The inventors determined that the foregoing film adhesive application techniques were deficient for use in the high pressure co-cure molding process according to the present invention to fabricate LHCC articles where minimization of overall aircraft system weight was a critical design criterion. All of the adhesive film application techniques evaluated resulted in ramped honeycomb cores that had a higher than desired total density, and were, therefore, unsuitable from a weight standpoint.

Figure 3A:
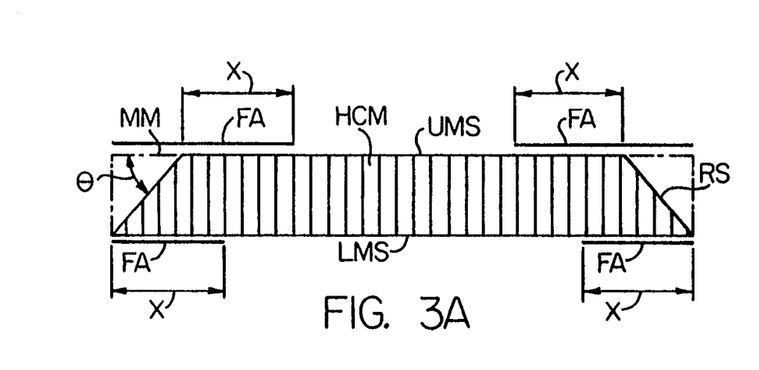
FIGS. 3A–3B illustrate the adhesive film application technique for stabilizing honeycomb core material and prepping ramped honeycomb cores to provide low total density, stabilized ramped honeycomb cores for use in a high pressure co-cure molding process according to the present invention.
Figure 3B:
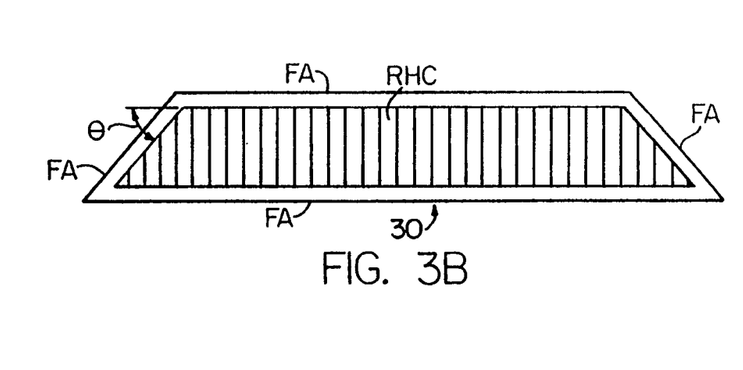

The film adhesive application technique determined by the inventors to be the optimum application technique, i.e., one that results in a low total density, stabilized ramped honeycomb core 30 suitable for the high pressure co-cure molding process utilizing the composite molding apparatus 10 according to the present invention is illustrated in FIGS. 3A, 3B. FIG. 3A illustrates honeycomb core material HCM (which may be made from a material such as NOMEX ®, a registered trademark of E. I. Du Pont de Nemours & Co., Wilmington, Del., for an aramid fiber or fabric-fiberglass, or graphite) stabilized by an application of 0.03 wt film adhesive FA to both the upper and lower major surfaces UMS, LMS in a picture frame format. More specifically, the layer of film adhesive FM applied to the upper major surface UMS extends inwardly a predetermined distance X beyond the ramped surfaces RS to be machined. The layer of film adhesive FM applied to the lower major surface LMS extends inwardly the predetermined distance X from the edges of the honeycomb core material HCM. The predetermined distance X is based upon the height and rectangular dimensions of the honeycomb core material HCM and the ramp angle $\theta$ of the ramped surfaces. For example, for honeycomb core material HCM having a ¾ inch height and 2′by 2′rectangular dimensions, and wherein the ramped surfaces RS to be formed will have a ramp angle $\theta$ of about 20°, the predetermined distance X was about 3 inches.

FIG. 3B depicts the ramped honeycomb core RHC derived by machining the stabilized honeycomb core material HCM illustrated in FIG. 3A, as described in the preceding paragraph, to remove honeycomb material MM to form the ramped surfaces RS. To prep the ramped honeycomb core RHC for the co-curing procedure, a layer of 0.03 wt film adhesive is applied to the upper and lower major surfaces UMS, LMS and the ramped surfaces RS of the ramped honeycomb core RHC to form the low total density, stabilized ramped honeycomb core 30 of FIG. 3B (see also FIG. 4). For the embodiment described in the preceding paragraph, the low total density, stabilized ramped honeycomb core 30 had a total density of about 3 lbs/ft$^3$, which is significantly less than the total density of stabilized ramped honeycomb cores fabricated utilizing conventional techniques.

The film adhesive FA utilized for "stabilizing" the honeycomb core material for the net shaping operation and for "prepping" the ramped honeycomb core for the co-curing procedure is a film adhesive selected from a group of commercially available, epoxy based film adhesives having an areal weight of 0.03 lb/ft$^2$ such as FM300, FM300-2, M1146, or AF-191. The foregoing representative low density film adhesives have a cure temperature of between 250° F. to 350° F.

Figure 4:
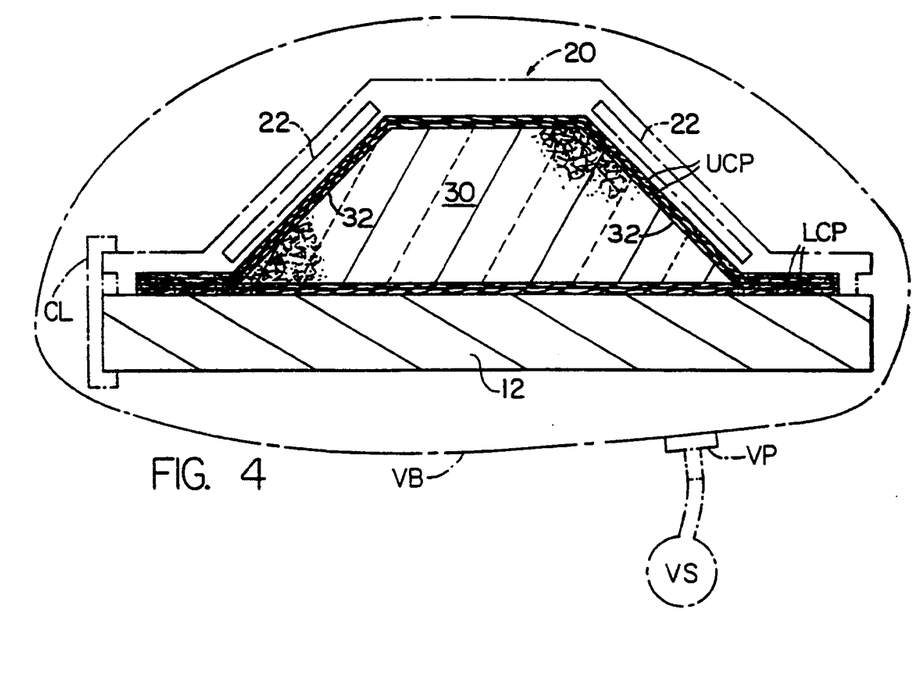
FIG. 4 illustrates the use of the composite molding apparatus of FIG. 1 for the high pressure co-cure molding process utilizing a stabilized, low density ramped honeycomb core according to the present invention.
Figure 5:
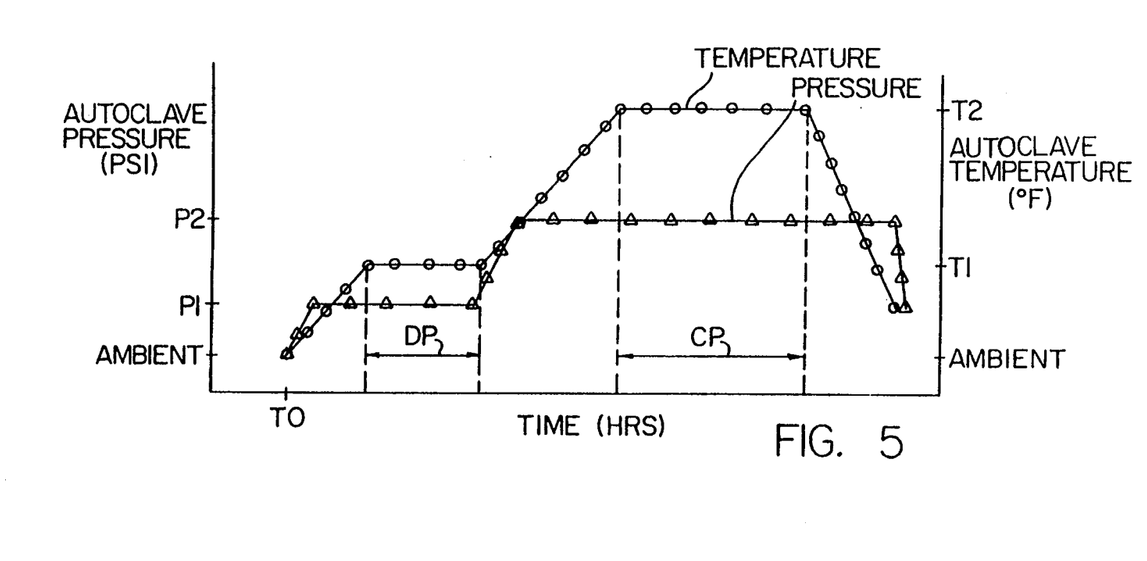
FIG. 5 is a graph illustrating an exemplary two-stage pressure, temperature cycle for the high pressure co-cure molding process according to the present invention.

The high pressure co-cure molding process according to the present invention is described in the following paragraphs and exemplarily illustrated in FIG. 5. The high pressure co-cure molding process is a modified semi-rigid molding assembly technology that incorporates the composite molding apparatus 10 described hereinabove and which utilizes the stabilized, low density ramped honeycomb core 30 described in the preceding paragraph to fabricate LHCC articles. The high pressure co-cure molding process according to the present invention utilizes a two-stage pressure, temperature cycle to fabricate LHCC articles. The lay-up procedure for the molding process comprises laying-up one or more layers of composite prepregs LCP onto the rigid base member 12 as illustrated in FIG. 4. The stabilized, low total density ramped honeycomb core 30 is stacked on the lower composite prepreg LCP layers. Next, one or more layers of composite prepregs UCP are layed-up in combination with the stabilized, low density ramped honeycomb core 30 and the lower composite prepreg LCP layers. Once the lay-up procedure is completed, the semi-rigid mold member 20 is secured in combination with the rigid base member 12 (a securing clamp CL is exemplarily illustrated in FIG. 4).

The layed-up composite molding apparatus 10 is then sealed in a vacuum bag VB as illustrated in FIG. 4. The vacuum bag VB is operative to encapsulate the composite molding apparatus 10 for insertion into an autoclave (not illustrated) wherein the two-stage pressure, temperature cycle is implemented. The vacuum bag VB may be formed from an elastic material such as nylon or an elastomeric material such as silicone, neoprene, or nitrile rubbers, the selected material being non-permeable to the pressure inducing medium of the autoclave. The vacuum bag VB includes a vacuum port VP that provides a fluidic interconnection to a vacuum source VS.

The vacuum-bagged composite molding apparatus 10 is then inserted into the autoclave. The vacuum source VS is actuated to draw a vacuum inside the vacuum bag VB to cause the vacuum bag VB to conform to the layed-up composite molding apparatus 10. The autoclave is pressurized to a predetermined dwell pressure P1. The predetermined dwell pressure P1 of the autoclave is transmitted through the vacuum bag VB and the semi-rigid mold member 20 to debulk the layed-up composite prepregs UCP, LCP. Next the autoclave temperature is gradually increased above the ambient level, e.g., at a rate of about 2°-4° F./min, to a predetermined dwell temperature T1. Once the autoclave has reached the predetermined dwell temperature T1, the autoclave is stabilized at the dwell pressure P1 and the predetermined dwell temperature T2 for a predetermined dwell period DP.

After the predetermined dwell period DP has elapsed, the vacuum inside the vacuum bag VB is vented utilizing the vacuum port VP. The pressure inside the autoclave is then increased to a predetermined high pressure P2. The predetermined high pressure P2 of the autoclave is transmitted through the vacuum bag VB and the semi-rigid mold member 20 to provide the co-cure pressure for the layed-up composite prepregs UCP, LCP and the stabilized, low density ramped honeycomb core 30. The rigid reinforcement inserts 22, due to their rigidity and configuration, cause a symmetrical pressure distribution to be exerted against the ramped surfaces of the LHCC article being fabricated, i.e., over the ramped surfaces 32 of the low total density, stabilized honeycomb core 30 and the corresponding overlayed composite prepregs. Next, the autoclave temperature is gradually raised to a predetermined co-cure temperature T2. Once the autoclave temperature reaches the predetermined co-cure temperature T2, the predetermined high pressure P2 and the predetermined co-cure temperature T2 are maintained for a predetermined co-cure period CP to ensure complete curing of the composite prepregs UCP, LCP and bonding between the composite prepregs UCP, LCP and the stabilized, low density ramped honeycomb core 30.

After the elapse of the predetermined co-cure period CP, i.e., the LHCC article is cured to finished form, the autoclave is cooled to ambient temperature while maintaining the predetermined high pressure P2. Once ambient temperature is reached, the autoclave is depressurized, the encapsulated composite molding apparatus 10 is removed from the autoclave, debagged, and semi-rigid mold member 20 unsecured from the rigid base member 12 so that the finished LHCC article may be removed.

For the high pressure co-cure molding process described hereinabove utilizing the composite molding apparatus 10 and the stabilized, low density ramped honeycomb core 30, the predetermined dwell pressure P1 was about 25 psi, the predetermined dwell temperature T1 was about 180° F. ±10° F., and the predetermined dwell period DP was about one hour. Further, the predetermined high pressure T2 was about 75 psi, the predetermined co-cure temperature T2 was about 350° F. ±10° F., and the predetermined co-cure period CP was at least two hours minimum.

A variety of modifications and variations of the present invention are possible in light of the above teachings. It is therefore to be understood that, within the scope of the appended claims, the present invention may be practiced otherwise than as specifically described hereinabove.

What is claimed is:

1. A composite molding apparatus for high pressure co-cure molding of a lightweight honeycomb core composite article having at least one ramped surface, comprising:

a rigid base member having a molding surface; and a complementary semi-rigid mold member having molding surfaces and at least one internal rigid reinforcement insert, said semi-rigid mold member comprising a combination of layers of reinforced tooling material and unreinforced elastomeric material with said at least one rigid reinforcement insert interleaved between layers of said reinforced tooling material and said unreinforced elastomeric material wherein said semi-rigid mold member exhibits flexibility during high pressure co-cure molding such that said molding surfaces conform to and define the outer mold line surface of the lightweight honeycomb core composite article to be fabricated;

said composite molding apparatus having a configuration for high pressure co-cure molding of the lightweight honeycomb core composite article to be fabricated, wherein composite prepregs and a low total density, stabilized ramped honeycomb core having at least one ramped surface are layed up in said composite molding apparatus to form the lightweight honeycomb core composite article having a least one ramped surface, said at least one rigid reinforcement insert of said complementary semi-rigid mold member having a configuration that matches the at least one ramped surface of the low total density, stabilized ramped honeycomb core and being disposed in opposed, parallel relation to the at least one ramped surface of the laved-up low total density, stabilized ramped honeycomb core such that said at least one rigid reinforcement insert is operative to provide symmetric pressure distributions over the at least one ramped surface of the low total density, stabilized ramped honeycomb core and overlayed composite prepregs during high pressure co-cure molding.

2. The composite molding apparatus of claim 1 wherein the low total density, stabilized ramped honeycomb core of the lightweight honeycomb core composite article to be fabricated has a plurality of ramped surfaces, and wherein said semi-rigid molding member has a plurality of internal rigid reinforcement inserts corresponding in number to the plurality of ramped surfaces.

3. The composite molding apparatus of claim 1 wherein said at least one internal rigid reinforcement insert is fabricated from aluminum.

* * * * *